Jan. 21, 1930.  A. PARMET  1,744,056
METER PROTECTIVE DEVICE AND SET-IN INCLOSED ELECTRIC SWITCH
Filed June 25, 1925  2 Sheets-Sheet 1
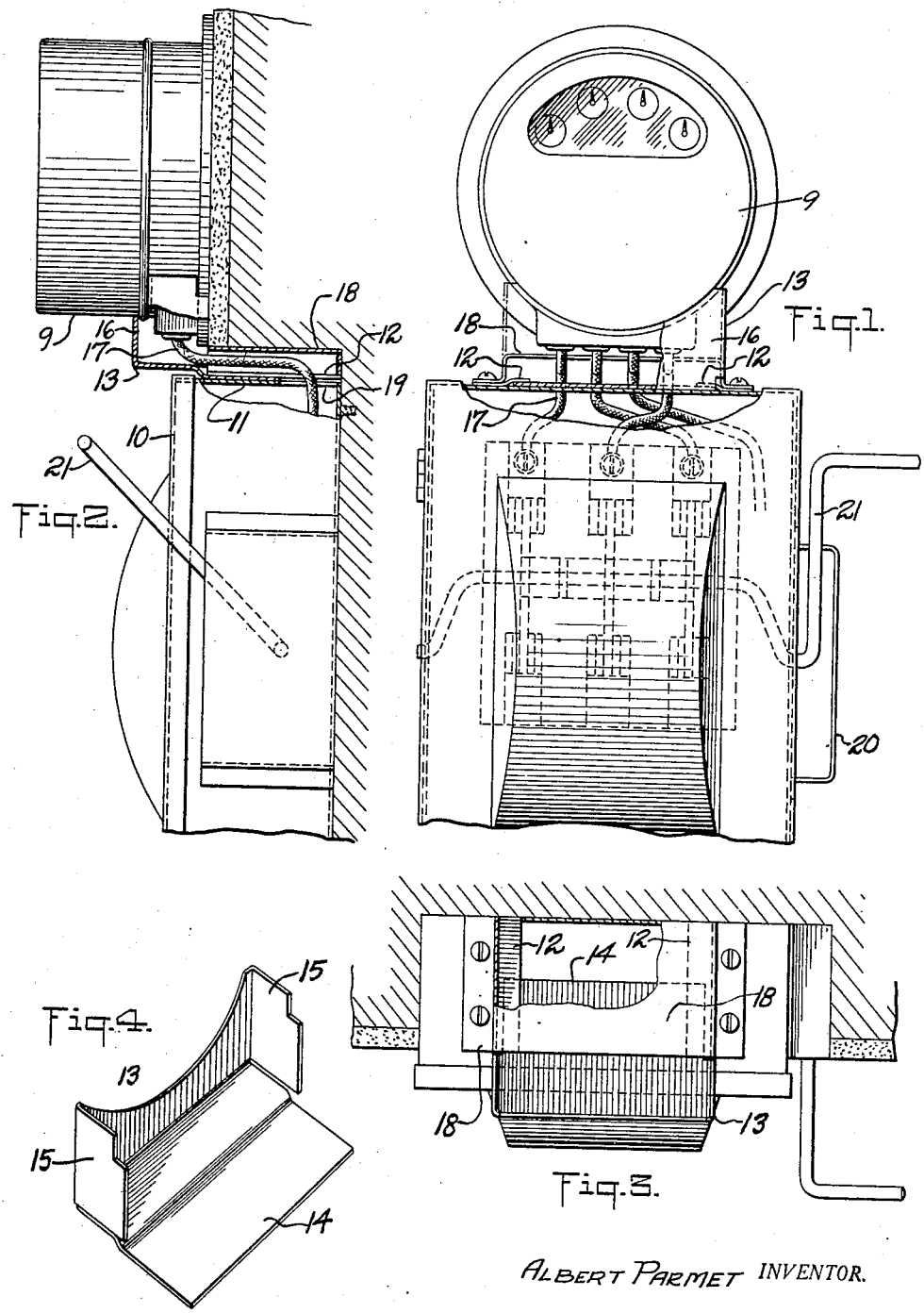
ALBERT PARMET INVENTOR.
BY Emanuel Scheyer
ATTORNEY

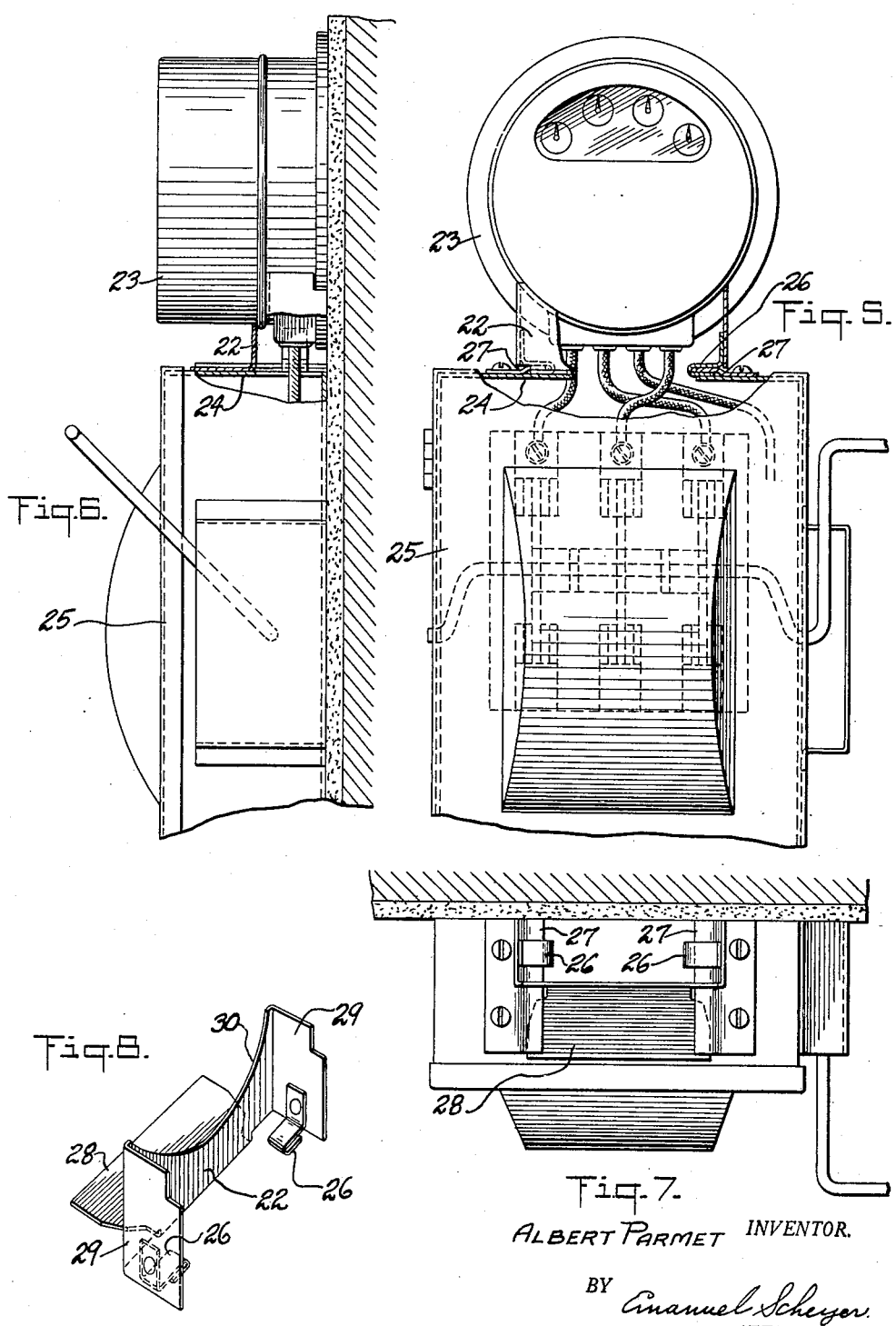

Patented Jan. 21, 1930

1,744,056

UNITED STATES PATENT OFFICE

ALBERT PARMET, OF NEW YORK, N. Y., ASSIGNOR TO COLUMBIA METAL BOX COMPANY, OF NEW YORK, N. Y.

METER-PROTECTIVE DEVICE AND SET-IN INCLOSED ELECTRIC SWITCH

Application filed June 25, 1925. Serial No. 39,528.

This invention relates to the connective devices between a meter and an electric appliance, such as a switch placed adjacent to the meter. It provides simple means for encasing the wires passing from the meter to the electric appliance without requiring special connective elements on the meter itself. The meter adapter or connective element, in one form of my invention, is made of a single piece of stamped sheet metal adapted to be slid into place between the meter and the appliance. For the sake of simplicity in the specification including the claims, the appliance is referred to as an inclosed switch, although it is to be understood that the invention applies as well to other forms of inclosed electric appliances. The switch in one adaptation of my invention is set in the wall and the meter adapter suitably formed to lead the wires to a specially provided wire-way through which the wires pass on their way to the switch. A handle-way is also provided to permit of the operation of the switch handle where it reaches back into the wall. A modified form of my adapter is also shown in connection with an inclosed switch mounted near a meter, the switch being fastened to the normal surface of the wall.

Other objects and advantages will become apparent upon a further study of the description and drawings in which:—

Figure 1 is a front elevation of a meter and inclosed switch set in the wall, showing the connective devices between them, a portion of the switch and meter adapter being broken away; Figure 2 is a side elevation with similar portions broken away; Figure 3 is a plan of the switch and connective devices shown with the meter removed; Figure 4 is a perspective of the meter adapter shown in Figure 1; Figure 5 shows a modified form of my invention and is an elevation of a meter and inclosed switch with connective devices, set upon the normal surface of the wall, certain portions being broken away; Figure 6 is a side view of the construction shown in Figure 5, also with certain portions broken away; Figure 7 is a plan view of the construction shown in Figure 5, with the meter omitted and Figure 8 is a perspective of the meter adapter of Figure 5.

Below meter 9 (Figures 1 and 2) is the inclosed switch 10 shown set in the wall. The top wall 11 of the switch casing is provided with guides 12 preferably welded to said wall.

Meter adapter 13 is provided with a tongue 14, side walls 15 and face 16 suitably cut out to fit the meter. Tongue 14 is adapted to be slid under guides 11 so that face 16 engages the meter in front of wires 17 leading therefrom, and side walls 15 butt against the face of the building wall. The adapter is preferably made of a single piece of sheet metal suitably stamped to the desired form.

Fastened to the top wall 11 is a channel-shaped wire-way 18, through which wires 17 are led to the opening 19 in the switch. At the side of the switch casing, is provided a channel-shaped handle-way 20 in which the external handle 21 of the switch can operate.

It is to be understood that instead of having the switch directly below the meter as shown in the drawings, it can be placed in other relative positions and still come within the scope of the present invention, in which case my construction can be modified by anyone skilled in the art to suit the given relative positions.

When the door of switch 10 is closed, adapter 13 cannot be removed. Switches of this type are usually provided with a lock or seal to prevent unauthorized opening of the door.

In the modified form of my construction, shown in Figures 6 to 8, for a switch set on the surface of a wall, the adapter 22 is set between meter 23 and the top wall 24 of switch 25.

Adapter 22 is provided with slides 26 adapted to be slid under guides 27 which are suitably fastened to the top wall of switch 25. Said adapter is provided with side walls 29 and face 30 suitably cut out to fit the meter. Tongue 28 is provided to prevent removal of the adapter when the door of switch 25 is locked.

I claim:—

1. In a meter installation, an inclosed switch comprising a casing adapted to be set in a recess formed in a wall, a meter adapter having an edge suitably formed to contact with the meter, said adapter having a tongue adapted to extend within said recess, and guides fastened upon the outside of one wall of said casing between which said tongue can be slid for holding said adapter to said casing.

2. In a meter installation an inclosed switch comprising a casing adapted to be set in a recess formed in a wall, a meter adapter having its upper edge suitably formed to contact with the meter, said adapter having a bottom portion adapted to extend within said recess on top of the top wall of the casing, guides on the outside of the top wall of the casing between which said portion can be slid for holding said adapter to the casing, and a front door for said casing with its upper end extended to project over the top wall of the casing, said bottom portion of the adapter being offset to pass over the upper end of the door when closed, a shoulder being formed between the part over the door and the part on the top wall of the casing, the upper end of said door being in line with said shoulder thereby preventing removal of the adapter when the door is closed.

3. In a meter installation, an inclosed switch comprising a casing adapted to be set in a recess formed in a wall, sheet metal guides fastened to the outside of said casing running in a front to rear direction forming substantially parallel grooves, a sheet metal member, open at the front and having its side portions fastened to said casing near said guides, adapted to maintain a wire-way between the casing and a side of said recess, and a meter adapter having sidewalls and front and bottom walls formed to contact with the meter and the casing for closing the front of the wire-way, the bottom wall of said adapter having a rearward extension engaging said guides.

4. In a meter installation, an inclosed switch comprising a casing adapted to be set in a recess formed in a wall, a member open at the front fastened to one wall of said casing formed to maintain a wire-way between the casing and a side of said recess, and a meter adapter having sidewalls and front and bottom walls formed to contact with the meter and the casing for closing the front of the wire-way, said casing having a door at its front projecting when closed beyond the wall of the casing at the wire-way, the bottom wall of the adapter extending from the front wall of the adapter back into the wire-way and being offset downward where it has passed over the closed door of said casing.

5. In a meter installation, an inclosed switch comprising a casing adapted to be set in a recess formed in a wall, a member open at the front and fastened to one wall of the casing adapted to maintain a wire-way between said casing wall and its corresponding side of the recess, guides located inside of said member running in a front to rear direction, and a meter adapter having walls formed to contact with said meter and to close the front of the wire-way, said meter adapter walls comprising an elongated bottom wall projecting backward for slidable engagement with said guides inside of said wire-way.

6. In a meter installation an inclosed switch comprising a casing adapted to be set in a recess formed in a wall, a meter adapter having a front face and sidewalls formed for contacting with the meter, said adapter having a bottom having its rear portion adapted to extend beyond the rear edges of said sidewalls within said recess above the top of the top wall of the casing, guides fastened to the outside of the top wall of the casing running from front to back into which said rear portion can be slid for holding said adapter to the casing, and a front door for said casing with its top extending above the top wall of the casing, said rear portion when in position in the guides being below the level of the top of the door when shut, whereby the door when shut blocks removal of the adapter.

ALBERT PARMET.